(12) United States Patent
Pepe et al.

(10) Patent No.: US 7,029,725 B2
(45) Date of Patent: *Apr. 18, 2006

(54) PROCESS FOR PROVIDING BARRIER PROPERTIES TO POROUS SUBSTRATES

(75) Inventors: Frank Ralph Pepe, Quakertown, PA (US); Charles Raymond Hegedus, Allentown, PA (US); John Joseph Rabasco, Allentown, PA (US)

(73) Assignee: Air Products Polymers, L.P., Allentown, PA (US)

(*) Notice: Subject to any disclaimer, the term of this patent is extended or adjusted under 35 U.S.C. 154(b) by 92 days.

This patent is subject to a terminal disclaimer.

(21) Appl. No.: 10/795,630

(22) Filed: Mar. 8, 2004

(65) Prior Publication Data

US 2005/0196540 A1    Sep. 8, 2005

(51) Int. Cl.
*B05D 3/02*    (2006.01)

(52) U.S. Cl. ............ 427/393; 427/393.4; 427/393.6; 427/397

(58) Field of Classification Search .............. None
See application file for complete search history.

(56) References Cited

U.S. PATENT DOCUMENTS

| | | | |
|---|---|---|---|
| 3,355,322 A * | 11/1967 | Worrall et al. ........... 428/514 |
| 3,754,983 A | 8/1973 | Parker |
| 3,900,620 A | 8/1975 | Gilman et al. |
| 4,229,507 A | 10/1980 | Kai et al. |
| 4,276,329 A | 6/1981 | Vasishth et al. |
| 4,285,997 A | 8/1981 | Vasishth et al. |
| 4,702,957 A * | 10/1987 | Mudge ................ 442/327 |
| 5,051,129 A | 9/1991 | Cuthbert et al. |
| 5,369,168 A * | 11/1994 | Famili et al. ............ 525/57 |
| 5,702,509 A | 12/1997 | Pellerite et al. |
| 5,872,181 A * | 2/1999 | Daniels et al. ........... 524/563 |
| 6,063,858 A * | 5/2000 | Daniels et al. ........... 524/563 |
| 6,166,113 A * | 12/2000 | Haerzschel et al. ........ 524/5 |
| 6,319,978 B1 * | 11/2001 | Daniels et al. ........... 524/564 |
| 6,395,817 B1 * | 5/2002 | Rabasco et al. .......... 524/459 |
| 6,555,641 B1 | 4/2003 | Parker et al. |
| 6,559,259 B1 * | 5/2003 | Kohlhammer et al. ...... 526/287 |
| 6,593,412 B1 * | 7/2003 | Rabasco et al. .......... 524/459 |
| 2003/0073777 A1 * | 4/2003 | Eknoian et al. .......... 524/502 |
| 2003/0121445 A1 * | 7/2003 | Herbert et al. ............ 106/16 |
| 2004/0096683 A1 * | 5/2004 | Ikeda et al. ............. 428/500 |
| 2004/0241475 A1 | 12/2004 | Morabito |

FOREIGN PATENT DOCUMENTS

| EP | 1069169 | * | 1/2001 |
|---|---|---|---|
| JP | 09087061 A2 | | 9/1995 |
| JP | 2000-238011 A2 | | 2/1999 |

OTHER PUBLICATIONS

Abstract of Mizumachi et al, Mokuzai Gakkaishi, 25(4), pp 288-295, 1979.*

* cited by examiner

*Primary Examiner*—Erma Cameron
(74) *Attorney, Agent, or Firm*—Mary E. Bongiorno; Russell L. Brewer

(57) ABSTRACT

The invention relates to an improvement in a process for imparting barrier properties to porous substrates, such as, concrete, masonry products, and wood products. The process comprises the steps of: applying an aqueous based sealing composition comprising a polymeric resin to said porous substrate, evaporating the water and forming a water repellent coating of said polymeric resin on said porous substrate. The improvement comprises: deriving the polymeric resin from an aqueous based polymer emulsion comprising a polymer comprised of emulsion polymerized units of vinyl acetate and ethylene, preferably with a carboxylic acid monomer, the polymer containing amorphous and crystalline ethylene segments and having:

(a) a crystalline melting point ($T_m$) ranging from 35 to 110° C., preferably 50 to 100° C.; measured at a heat rate of 20° C./minute; and, (b) a tensile storage modulus of at least $1 \times 10^5$ dynes/cm² at 115° C. measured at 6.28 rad/sec.

13 Claims, No Drawings

PROCESS FOR PROVIDING BARRIER PROPERTIES TO POROUS SUBSTRATES

BACKGROUND OF THE INVENTION

Porous substrates such as concrete, masonry and wood products are vulnerable to the general effects of weathering and, specifically, to exposure to water and oil. The weathering of concrete substantially shortens the useful life of structures such as highways, bridges, parking ramps, and the like. Exposure of concrete and masonry substrates to water and oil can also significantly shorten the useful life of the product and reduce its aesthetic appeal even before it is no longer functional.

Wood is another product having a porous surface which is used extensively as an interior and exterior construction material for decks, siding, fencing, cedar roofs, walkways, sheds, pedestrian bridges, docks, piers, trellises, log structures, and other wood substrates requiring protection from water, because of its structural integrity, availability, ease of use, and attractive economics. Wood when exposed to water and harsh environmental conditions can deteriorate by a number of mechanisms. For example, wood can deteriorate from ultraviolet light exposure, mildew, splitting, extreme temperatures and temperature changes, water intrusion, etc. Associated with these are customary environmental wet/dry cycles, which cause wood to cyclically swell and contract, causing structural damage.

Water repellent coatings have been formulated for a number of porous substrate materials. Two approaches are commonly taken to obtain water repellency, barrier type materials and highly hydrophobic type materials. Barrier coatings are simply a physical barrier between the environment and the substrate being protected. Common polymeric materials for barrier type waterproofing are vinyl chloride, polyvinyl chloride, polyethylene, butyl rubber, tar, asphalt, paints, polyurethane, and epoxy. To prevent, or minimize these effects, it has been common to treat wood with coatings that repel water, commonly referred to as water repellents, water proofers, and sealers and provide other barrier properties. These coatings can be film forming and/or penetrating coatings.

As stated above, a number of different types of coating materials have been used to impart water repellency to surfaces such as concrete, masonry products and wood. For the most part, they are either highly toxic or harmful to the environment, contain high organic solvent concentrations, are not as effective as is desired, are economically expensive, and/or must contain various additives to impart water repellency/hydrophobicity to the surface being coated. Also, such coatings may also seal the product completely, preventing or greatly reducing the escape of moisture from the coated substrate.

The following references are representative of the art with respect to methods and compositions for imparting weather resistance to porous substrates such as concrete, masonry and wood products.

U.S. Pat. No. 6,555,641 discloses waterborne wood coating formulations based upon water reducible alkyds and acrylic latex materials as a means to obtain a desirable level of water for repellency for wood products. Highly hydrophobic additives are included in the wood coating formulations.

U.S. Pat. No. 4,285,997 discloses a method for treating wood to enhance its properties. The method comprises contacting the wood to be treated with sufficient water dilutable acrylic resin formed from at least one vinyl monomer in a solvent consisting essentially of water to deposit an effective amount of said resin in the cell walls of said wood. The resin contains molecules having a molecular weight of less than about 1000 and of a size which can enter the free space of the cell walls and in an amount sufficient to stabilize the wood. The resin also has a minimum film forming temperature of not greater than ambient, and converts to a water insoluble form at ambient conditions in the cell walls.

U.S. Pat. No. 4,276,329 discloses a method for treating wood to enhance its properties comprising: contacting the wood to be treated with sufficient water dilutable resin in a water miscible solvent, the resins capable of being converted within the cell walls of the wood to a water insoluble form. Water dilutable alkyds and urethane modified alkyds are disclosed as preferred resins.

JP 2000-238011 A2 (Chemical Abstracts abstract) discloses a timber surface treatment by coating the timbers with polymer resin by immersing in an emulsion containing $\geq 1$ selected from ethylene-vinyl acetate copolymer, poly(vinyl acetate), and acrylic styrene copolymer, to prevent the timbers from water penetration or evaporation.

U.S. Pat. No. 3,754,983 discloses wax polymer compositions suitable for imparting water resistance to paper, paperboard, or wood, designed for application at $\geq 200°$ F., consisting of a mixture of paraffin wax (m.p. 143–150° F.) 70–90, 5–30% by weight of an ethylene-vinyl acetate copolymer (Elvax 260) and a gel-forming agent, e.g., Al alkoxide, Sec-butoxyaluminum stearate, aluminum 2-ethylhexoxide, aluminum isopropoxide, or aluminum sec-butoxide (II), 1–5%.

U.S. Pat. No. 4,229,507 discloses a barrier coating for wood to prevent excessive drying and shrinkage on the surface of wood comprised of aqueous polymeric emulsions having a minimum film-forming temperature of not higher than 40° C. Examples include butadiene-styrene latexes, acrylics, synthetic rubbers, polyvinyl acetate, and ethylene vinyl acetate copolymers. Example 5 discloses a wood product coated with an ethylene-vinyl acetate copolymer having a minimum film-forming temperature of 10° C. (Sumica Flex 500).

U.S. Pat. No. 3,900,620 discloses aluminum systems as wood-stain reducing agents based upon water soluble aluminum halides. These halides can be incorporated as a single emulsion, with a latex emulsion or water base emulsion paints. The aqueous based emulsions include an acrylic latex, a polyvinyl acetate copolymer (UCAR 1251), a vinyl acrylics, and an alkyd.

U.S. Pat. No. 5,702,509 ('509) and U.S. Pat. No. 5,051,129 ('129) disclose water repellant compositions for treating masonry surfaces. The '509 patent discloses the use of hydrophobic moiety-containing compounds such as alkoxysilanes, alkoxysiloxanes and '129 discloses the use of water soluble coupling agent and an alkyltrialkoxysilane to provide barrier properties.

BRIEF SUMMARY OF THE INVENTION

The invention relates to an improvement in a process for imparting barrier properties, e.g., water repellency to porous substrates, such as, concrete, masonry products, wood products and the like. The process comprises the steps of: applying an aqueous based sealing composition comprising a polymeric resin to said porous substrate, evaporating the water and forming a water repellent coating of said polymeric resin on said porous substrate. The improvement comprises: deriving the polymeric resin from an aqueous based polymer emulsion comprising a polymer comprised of emulsion polymerized units of vinyl acetate and ethylene, preferably with a carboxylic acid monomer, the polymer containing amorphous and crystalline ethylene segments and having:

(a) a crystalline melting point ($T_m$) ranging from 35 to 110° C., preferably 50 to 100° C.; measured at a heat rate of 20° C./minute; and, (b) a tensile storage modulus of at least $1 \times 10^5$ dynes/cm$^2$ at 115° C. measured at 6.28 rad/sec.

Significant advantages can be obtained through the use of the above described polymer emulsions and these include:

an ability to generate sealant compositions for porous substrates, e.g., wood products having improved water repellency;

an ability to use an emulsion polymer in the sealing composition thus avoiding the emulsion formulation associated with bulk polymerized ethylene/vinyl acetate polymers;

an ability to eliminate the need for waxes and water repellant additives; and an ability to eliminate or greatly reduce the organic solvent content, including volatile organic compounds (VOCs) and hazardous air pollutants (HAPs).

DETAILED DESCRIPTION OF THE INVENTION

This invention is directed to a process for improving the weatherability of porous substrates to environmental elements which comprises applying an aqueous-based sealing composition comprising a polymeric resin and drying the sealing composition; the polymeric resin derived from a polymer emulsion in which the polymer is comprised of emulsion polymerized units of ethylene and vinyl acetate and contains amorphous and crystalline ethylene segments. The ethylene-vinyl acetate (EVA) polymers of this invention that are utilized for improving weatherability have:

a) a crystalline melting point ($T_m$) ranging from 35 to 110° C., preferably 50 to 100° C.; measured at a heat rate of 20° C./minute; and, (b) a tensile storage modulus of at least $1 \times 10^5$ dynes/cm$^2$ at 115° C. measured at 6.28 rad/sec.

Preferably, the ethylene-vinyl acetate polymers have a crystalline heat of fusion ($H_f$) ranging from about 5 to 100 joules per gram (J/g), preferably 10 to 50 J/g, measured at a heat rate of 20° C. per minute, and a glass transition temperature ($T_g$) of +25° C. to about −35° C. The polymer should have a volume average particle size of less than or equal to 2 microns, preferably less than or equal to 0.5 microns as measured by Horiba light scattering. Horiba light scattering reports distribution data by volume (not by number). Small numbers of large particles within a distribution can add significantly to the large particle end of the distribution.

The aqueous based, emulsion polymerized polymers of this invention are based upon vinyl acetate and ethylene and optionally other monomers. The level of polymerized units of vinyl acetate can range from 10 to 90% by weight of the polymer and the level of polymerized units of ethylene can range from 10% to 90% by weight; preferably from 40 to 70 weight percent vinyl acetate and 30 to 60% by weight ethylene.

The polymers of this invention preferably also comprise polymerized units of carboxylic acid monomers. The carboxylic acid monomers can include $C_3$–$C_{10}$ alkenoic acids, such as acrylic acid, methacrylic acid, crotonic acid, and isocrotonic acid, and alpha, beta-unsaturated $C_4$–$C_{10}$ alkenedioic acids such as maleic acid, fumaric acid, and itaconic acid. Typically, these acids are incorporated in an amount of from 0.1 to 10% by weight and preferably 0.5 to 5% by weight. Exemplary polymers for water repellent applications have vinyl acetate content of from 15 to 80%, the ethylene content from 20 to 85%, and the content of carboxylic acid from 0 to 5% by weight of the polymer.

Other monomers which can be emulsion polymerized into the polymer include, but are not limited to a $C_1$ to $C_{15}$ alkyl vinyl ester, a $C_1$ to $C_{15}$ alkyl acrylate or a $C_1$ to $C_{15}$ alkyl methacrylate, such as methyl(meth)acrylate, ethyl(meth) acrylate, propyl (meth)acrylate, butyl(meth)acrylate, and 2-ethylhexyl(meth)acrylate, a $C_1$ to $C_6$ hydroxyalkyl(meth) acrylate, such as, hydroxyethyl(meth)acrylate and hydroxypropyl (meth)acrylate, a $C_1$ to $C_{15}$ alkyl maleate, $C_1$ to $C_{15}$ alkyl fumarate, acrylic acid, methacrylic acid, vinyl halides, such as vinyl chloride; mono and diesters of alpha, beta-unsaturated $C_4$–$C_{10}$ alkenedioic acids such as maleic acid, fumaric acid, and itaconic acid and $C_1$–$C_{18}$ alkanols; nitrogen containing mono-olefinically unsaturated monomers, particularly nitriles, amides, N-methylol amides, $C_1$–$C_4$ alkanoic acid ethers of N-methylol amides and allylcarbamates, such as acrylonitrile, acrylamide, methacrylamide, N-methylol acrylamide, N-methylol methacrylamide, N-methylol allylcarbamate, and $C_1$–$C_4$ alkyl ethers or $C_1$–$C_4$ alkanoic acid esters of N-methylol acrylamide, N-methylol methacrylamide and N-methylol allylcarbamate; sodium vinyl sulfonate; and 2-acrylamido-2-methyl propanesulfonate. The monomers can be incorporated in minor amounts, e.g. from 0 to about 10% by weight or about 0.1 to 10% by weight.

The usefulness of ethylene-vinyl acetate emulsion polymers described herein and their application are dictated by the polymer properties which are in turn affected by many factors outside the specific formulation employed, e.g., monomers employed, monomer ratio, initiator level and surfactant package, as well as the polymerization procedure. The distribution of vinyl acetate and of ethylene in the polymer are accounted for in the parameters $T_g$, $T_m$, $H_f$, and the high temperature tensile storage modulus.

The $T_g$ of ethylene-vinyl acetate polymers can be controlled by adjusting the ethylene content, i.e., generally the more ethylene present in the polymer relative to other comonomers, the lower the $T_g$. However, it has been found that under certain polymerization conditions where formation of crystalline polyethylene domains are favored, the $T_g$ does not continue to systematically decrease in proportion to the increase in ethylene concentration. The $T_g$ or the polymer is preferably selected to be less than of equal to 15° C.

The tensile storage modulus profile for these polymers provides an insight into the distribution of vinyl acetate and ethylene in the polymer and the melt flow characteristics. The polymers suited for use as water repellent barrier coatings for porous substrates such as wood products as described herein provide excellent coatings at low temperatures, they have a high tensile storage modulus and are highly viscous with minimal flow properties at temperatures where other ethylene-vinyl acetate and ethylene-vinyl acetate polymers melt and exhibit melt flow characteristics and thus provide barrier properties at high ambient temperatures. The modulus should be at least $1 \times 10^5$ in dynes/cm$^2$ (preferably $2 \times 10^5$) at 115° C. as measured at a test frequency of 6.28 rad/sec.

It has also been found that by influencing the balance of amorphous ethylene-vinyl acetate domains and crystalline ethylene domains in the polymer, one can generate a range of aqueous copolymer dispersions containing a range of $T_g$, $T_m$ and $H_f$ and a high tensile storage modulus at high temperatures, i.e., temperatures of about 115° C. Conventional vinyl acetate-ethylene (VAE) emulsion polymers do not exhibit a $T_m$ nor do they have an $H_f$ because these polymers do not have the ethylene crystallinity exemplified by the polymers described herein.

One preferred way to influence crystalline domain formation of ethylene in the ethylene-vinyl acetate polymer produced by emulsion polymerization is to delay the addition of vinyl acetate during the polymerization process such that the unreacted vinyl acetate level present in the reactor is minimal at different stages during the process, i.e., below 5% unreacted free vinyl acetate monomer. Typically, one completes the addition within 75% of the total polymerization period and generally within 3 hours or less. Thus, vinyl acetate and ethylene polymerization can take place in one stage where most, but not all, of the ethylene will reside in amorphous regions. The formation of the majority of crystalline ethylene domains then occurs in a subsequent stage of the polymerization process.

Other factors leading to crystalline ethylene domains within the polymer is the pressure and temperature of polymerization. Although pressure is influential in achieving higher ethylene concentration levels in the polymer, it also is a factor in determining whether the amount of ethylene which is present is in amorphous regions or crystalline domains. Temperature, also is relevant in the formation of ethylene crystallinity. Lastly, the level of initiator is also a factor in developing copolymers for water repellant coating applications.

In the preferred process for effecting polymerization and the formation of ethylene-vinyl acetate polymers for water repellent coating applications, polymerization of ethylene, vinyl acetate, and optionally other comonomers is initiated by thermal initiators or by redox systems. A thermal initiator is typically used at temperatures of about 60° C. or higher, preferably about 70° C. or higher. Redox systems can be used over a wide range of temperatures, but are typically used at temperatures of about 60° C. or lower. The amount of initiator used in the process typically is substantially higher than used in prior processes for forming aqueous based vinyl acetate/ethylene dispersion polymers. Typically, the level of initiator is at least 0.5% and typically greater than 0.8% by weight of the total monomer charged. In addition, it is preferred that the initiator is added over the time of polymerization. It is believed that a high radical flux created by the higher levels of initiator facilitates ethylene incorporation during this low pressure polymerization process and leads to crystalline ethylene segments and a branched polymer architecture in the resulting copolymer and thus exhibits a higher tensile storage modulus at elevated temperatures, thermal melting point, and a heat of fusion. Thermal initiators are well known in the emulsion polymer art and include, for example, ammonium persulfate, sodium persulfate, and the like. Suitable redox systems are based upon reducing agents and peroxides. Combinations of reducing agents, such as sodium formaldehyde sulfoxylate or erythorbates and peroxides such as t-butyl hydroperoxide (t-BHP) and hydrogen peroxide are representative.

The ethylene and, optionally, other monomers, are then introduced under a pressure of less than about 2000 psig (13,891 kPa), typically 1000 to 2000 psig (6996 to 13891 kPa), and agitation, and the temperature increased to reaction temperature. Initiator, vinyl acetate, and emulsifier are staged or added incrementally over the reaction period, and the reaction mixture maintained at reaction temperature for a time required to produce the desired product.

Chain transfer agents, water soluble or oil soluble, can be use in the preferred polymerization and formation of ethylene-vinyl acetate polymers for water repellant coating applications. Any of the common chain transfer agents known in the emulsion polymerization art can be used, such as mercaptan derivatives. Dodecylmercaptan is an example of an oil soluble chain transfer agent. For example, dodecylmercaptan can be dissolved in vinyl acetate monomer and introduced to the reactor via the monomer delay feed. Chain transfer agents are typically used in amounts less than 2 weight percent, based on total polymer weight.

The stabilizing system for emulsion polymerization can comprise surfactants and/or emulsifiers. It can also contain a cellulosic colloid, such as hydroxyethyl cellulose (HEC), in combination with surfactants or emulsifiers. The protective colloid can be used in amounts of about 0.1 to 10 wt %, preferably 0.5 to 5 wt %, based on the total monomers.

The surfactant or emulsifier can be used at a level of about 1 to 10 wt %, preferably 1.5 to 6 wt %, based on the total weight of monomers and can include any of the known and conventional surfactants and emulsifying agents, principally the nonionic, anionic, and cationic materials, heretofore employed in emulsion polymerization. Among the anionic surfactants found to provide good results are alkyl sulfates and ether sulfates, such as sodium lauryl sulfate, sodium octyl sulfate, sodium tridecyl sulfate, and sodium isodecyl sulfate, sulfonates, such as dodecylbenzene sulfonate, alpha olefin sulfonates and sulfosuccinates, and phosphate esters, such as the various linear alcohol phosphate esters, branched alcohol phosphate esters, and alkylphenolphosphate esters.

Examples of suitable nonionic surfactants include the Igepal® surfactants which are members of a series of alkylphenoxy-poly(ethyleneoxy)ethanols having alkyl groups containing from about 7 to 18 carbon atoms, and having from about 4 to 100 ethyleneoxy units, such as the octylphenoxy poly(ethyleneoxy)ethanols, nonylphenoxy poly(ethyleneoxy)ethanols, and dodecylphenoxy poly(ethyleneoxy)ethanols. Others include fatty acid amides, fatty acid esters, glycerol esters, and their ethoxylates, ethylene oxide/propylene oxide block polymers, secondary alcohol ethoxylates, and tridecylalcohol ethoxylates.

Average particle size distributions (by volume) for the polymer particles of the emulsion polymers range from about 2 microns or less, preferably 0.5 microns or less, as measured by Horiba light scattering. The smaller diameter particles allows the polymer to permeate the pores of the concrete, masonry and wood surfaces. The polymer particles remain in the pores of the porous substrate, e.g., wood thus affording a better seal.

In an example of using the emulsion polymers for water repellent coating applications of concrete, masonry and wood components, the emulsion polymers can be applied with brush, roller, spray or other suitable application techniques known in the art. Several properties are important for this application, including water repellent efficiency, ease of application, appearance, feel, water beading, and weather resistance.

Other components which may be added to the polymeric emulsion for sealing such porous substrates include additives commonly used in these and other coatings, such as surfactants, defoamers, co-solvents, ultraviolet (UV) stabilizers, light absorbers, biocides, mildewcides, pigments, and other commonly used additives used in the coatings industry. Other compounds which may be included in the formulations include stain resistant agents based upon aluminum halides, e.g., sodium aluminum chlorohydroxide lactate and calcium chlorohydroxide gluconate. Wood preservatives and fire retardants based upon tin and copper complexes can also be added. Examples include copper-8-quinoline, tributyltin adducts, cobalt napthenate, zirconium napthenate, pentachlorophenol, and so forth.

Many wood sealing compositions incorporate a wax and/or silicone as an added hydrophobe. Waxes may be added to the emulsion here but because of the crystalline ethylene segments in the polymer, waxes are not necessary and, in fact, the polymer itself acts as a waxy component.

The following examples, are intended to be purely exemplary of various embodiments within the context of the invention.

Ethylene levels in the polymer were determined by mass balance.

General Polymerization and Test Procedures Water Repellent Efficiency (WRE)

WRE is a method that gravimetrically measures the ability of a coating on wood (other suitable substrates can be evaluated with appropriate procedure modifications) to repel water. The test method that was followed is described in ASTM D5401. The only modifications to this method were the use of Southern yellow pine as a replacement for Ponderosa pine and a wood block size of approximately 1-inch (2.5 cm) by 1-inch by 1-inch. Results were reported in % WRE. WRE approaching 60% or greater are considered to be good for water repellent coatings.

Application and Evaluation on Cedar Wood

Coatings were applied liberally to the front face of cedar siding planks using a nylon polyester bristle brush at room temperature and visually evaluated for appearance during application and after drying. Coatings were dried at room temperature for 7 days prior to weathering exposure. Coated wood specimens (and uncoated wood specimens as controls) were evaluated for water beading, tack, color change, and wood degradation both before exposure and periodically during QUV-A accelerated exposure according to the following methods.

QUV-A (ASTM G154)

QUV-A bulb with irradiance 0.89 watts/m$^2$/nm at 340 nm, exposure cycle of 8 hours UV at 60° C. black panel temperature, 0.25 hours water spray (no light), 3.75 hours of condensation at 50° C. black panel temperature. Specimens were evaluated weekly for 5 weeks (840 hours).

Water Beading (ASTM D2921) Test to Evaluate the Presence and Effectiveness of Water Repellent Coating This test was performed by liberally spraying tap water on the wood surface using a standard pump sprayer. Water on the surface was evaluated on a relative scale from 0 (worst) to 5 (best) where 0 was complete wetting and penetrating into the wood and 5 represented water droplets of high contact angle in a spherical shape.

Tack

The test was performed by feeling the coated surface and rating the tack feel of the coating from 0 (no tackiness) to 3 (most tacky), where 0 felt most like the bare wood substrate and 3 represented an extreme rubbery tack feel.

Color Change

Relative visual comparison of exposed versus unexposed wood. Ratings ranged from 0 (no color change) to 5 (extreme color change).

Wood Degradation

Note was taken of the integrity of the wood and most specifically to warping and/or cracking. In addition to assessing each of the properties (i.e., water beading, tack feel, wood degradation), it was also important to assess the overall performance of each of the coatings throughout the exposure. In order to do this, a Total Performance Evaluation (TPE) was performed, which included contributions from each of these performance properties. TPE values were determined from the cumulative results of Darkness Change, Tack, and Beading. TPEs were calculated by adding the Darkness Change and Tack ratings, and then adding the value resulting from 5 minus the water beading value. For example, if a coating had a Darkness Change of 3, a Tack of 1, and a Beading of 2, the TPE value is 3+1+(5−2)=7. Therefore, the TPE values listed in Table 2, represent the cumulative values of 5 rating periods, of which specimens were evaluated each week for 5 weeks (840 hours) in QUV-A ASTM G154 Exposure. Note that in this analysis, lower TPE numbers indicate better performance.

Particle Size Distribution

Particle size distribution (PSD) was measured via Horiba Light Scattering and the median distribution reported. The median distribution represents the particle diameter equal to 50% of the cumulative distribution, in units of microns. This method reports distribution data by volume (not by number). Therefore, small numbers of large particles within a distribution can add significantly to the large particle end of the distribution.

Tensile Storage Modulus

Tensile storage modulus as a function of temperature was measured at a test frequency of 6.28 rad/sec and expressed as dynes/cm$^2$. ASTM-D-4065-94 and ASTM-D-5026-94 were used as guidelines for testing tensile storage modulus. More specifically, dynamic mechanical testing of the polymer samples for measuring tensile storage modulus was accomplished using the following procedure. Each polymer emulsion was cast as a film and allowed to dry a minimum of several days at ambient conditions. The dry film thickness was typically in the range of 0.3 to 0.5 mm. For samples that did not film form adequately at room temperature, the polymers were compression molded at 100 to 150° C. The specimens used for testing were die cut from the film and were about 6.3 mm wide and 30 mm long. The specimens were tested on a Rheometrics Solid Analyzer (RSA II), from Rheometric Scientific, Inc., to obtain the tensile dynamic mechanical properties. Data were obtained every 6° C. over the temperature range of −100 to 200° C., using a fiber/film fixture and a deformation frequency of 6.28 rad/sec. To help ensure linear viscoelastic conditions, the applied strains were typically 0.05% in the glassy region and up to 1% in the rubbery region. A soak time of one minute was used at each temperature to ensure isothermal conditions. For each temperature, the RSA II calculated the tensile storage modulus (E'), tensile loss modulus (E"), and tangent delta (tan δ) based on the width, thickness and length of the sample.

Measurement of $T_g$, $T_m$, and $H_f$ $T_g$, $T_m$, and $H_f$ were determined via differential scanning calorimetry (DSC) using a TA Instruments Thermal Analyst 3100 with DSC 2010 module. Polymer samples were thoroughly dried prior to testing. Samples were held at 100° C. in the calorimeter for 5 minutes, cooled to −75° C., and then the scan acquired at a heating rate of 20° C. per minute up to a final temperature of 200° C. The $T_g$ corresponds to the extrapolated onset values obtained from the baseline shift at the glass transition during the heating scan. The $T_m$ corresponds to the peak in the heat flow curve. The $H_f$ was calculated by integrating the area under the melting endotherm; the baseline for this integration was constructed by extrapolating the linear region of the heat flow curve after the melt, back to the point of intersection with the heat flow curve before the melt.

EXAMPLE 1

Preparation of 42.5% Ethylene, 55% Vinyl Acetate, 2.5% Acrylic Acid Polymer Using HEC/Surfactant Stabilizer System A polymer emulsion containing crystalline ethylene segments was prepared by first charging a one-gallon stainless steel pressure reactor with the following mixture:

| Material | Mass charged, g |
|---|---|
| DI Water | 700 |
| Rhodacal DS-10 | 9 |
| Natrosol 250GR (2% aqueous solution) | 500 |
| Ferrous ammonium sulfate (2% aqueous solution) | 6 |
| Monomer Solution comprising 94.71 wt % vinyl acetate, 4.71 wt % acrylic acid, and 0.571 wt % dodecylmercaptan | 120 |

Rhodacal ® DS-10 is sodium dodecyl benzene sulfonic acid.
Natrosol ® 250 GR is hydroxyethyl cellulose (HEC).

The following delay mixtures were utilized:

| Material | Mass charged, g |
|---|---|
| Aqueous 4.0% t-BHP | 130 |
| Aqueous 8% sodium formaldehyde sulfoxylates | 139 |
| Aqueous solution containing 52.5 g Rhodacal DS-10 and 297.5 g water | 306 |
| Monomer Solution comprising 94.71 wt % vinyl acetate, 4.71 wt % acrylic acid, and 0.571 wt % dodecylmercaptan | 540 |
| Ethylene | 1400 psig for 5.5 hours |

Agitation at 100 rpm was begun with a nitrogen purge. Agitation was then increased to 900 rpm and the reactor heated to 60° C. After pressurizing the reactor with ethylene to 1400 psig (9,754 kPa), 10 g of 8% aqueous sodium formaldehyde sulfoxylate was added to the reactor. Delay feeds of tert-butylhydrogen peroxide (4%) at 0.4 g/minute. and 8% sodium formaldehyde sulfoxylate at 0.4 g/minute were begun. After a 10 minute period, the surfactant delay was begun at 0.85 g/minute and the monomer solution delay was begun at 3.0 g/minute. Redox rates were adjusted during the reaction period to maintain reasonable reaction rates. Ethylene pressure of 1400 psig was maintained for 5.5 hours. The monomer solution delay was turned off at the 3 hour mark. The ethylene makeup valve was closed at the 5.5 hour mark. The surfactant delay and initiator delay were stopped at the 6 hour mark. The reaction was then cooled to 35° C., transferred to a degasser to remove unreacted ethylene, and 2 g of Rhodaline 675 defoamer was added. The following properties of the resulting emulsion polymer were measured:

| | |
|---|---|
| Polymer Composition (By solids calculation) | 42.5% Ethylene |
| | 55% Vinyl acetate |
| | 2.5% Acrylic Acid |
| $T_g$ Onset (° C.) | −27.1 |
| Viscosity (60/12 rpm) (cps) | 348/710 |
| 100/325 mesh coagulum (ppm) | 95/40 |
| % solids | 41.9 |
| pH | 4.0 |
| $T_m$(° C.)/$H_f$(J/g) | 89.9/15.8 |
| Tensile Storage Modulus | >1 × 10$^5$ dynes/cm$^2$ |

EXAMPLE 2

Preparation of 49% Ethylene, 48.6% Vinyl Acetate, 2.4% Acrylic Acid Polymer Using Anionic Surfactant Stabilizer System A polymer emulsion containing crystalline ethylene segments was prepared by the following procedure: A one-gallon stainless steel pressure reactor was charged with the following mixture:

| Material | Mass charged, g |
|---|---|
| DI Water | 1100 |
| Aerosol MA80-I | 10 |
| Monomer solution consisting of 94.71 wt % vinyl acetate, 4.71 wt % acrylic acid, and 0.571 wt % dodecylmercaptan | 120 |

Aerosol ® MA80-I supplied by Cytec is dihexyl sodium sulfonate.

The following delay mixtures were utilized:

| Material | Mass charged, g |
|---|---|
| Aqueous 10.0 wt % ammonium persulfate containing 4.0 wt % sodium bicarbonate | 127 |
| Rhodacal DS-10, diluted to 15% active | 260 |
| Monomer solution consisting of 94.71% vinyl acetate, 4.71% acrylic acid, and 0.571% dodecylmercaptan | 540 |
| Ethylene | 1400 psig for 5.5 hours |

Agitation at 100 rpm was begun with a nitrogen purge. Agitation was then increased to 900 rpm and the reactor heated to 80° C. After pressurizing the reactor with ethylene to 1400 psig (9754 kPa), 15 g of initiator solution was added at a rate of 5.0 g/minute. When the 15 g of initiator had been added, the initiator delay rate was reduced to 0.30 g/minute. At the 15 minute mark, the monomer delay was begun at 3.0 g/minute and the surfactant delay was begun at 0.72 g/minute. Ethylene pressure of 1400 psig was maintained for 5.5 hours. The vinyl acetate delay was stopped at the 3 hour mark. The ethylene supply was stopped at the 5.5 hour mark. The surfactant delay and the initiator delay were stopped at the 6 hour mark, followed by holding the reaction mixture at temperature for another 30 minutes. The reaction was then cooled to 40° C., transferred to a degasser, and 2 g of Rhodaline 675 defoamer was added. The following properties of the resulting emulsion copolymer were measured:

| Copolymer Composition (by solids calculation) | 49% Ethylene 48.6% Vinyl acetate 2.4% Acrylic acid |
|---|---|
| Copolymer Composition (by solids calculation) | 49% Ethylene 48.6% Vinyl acetate 2.4% Acrylic acid |
| $T_g$ Onset (° C.) | −27.3 |
| Viscosity (60/12 rpm) (cps) | 880/2410 |
| % solids | 48.3 |
| pH | 4.66 |
| $T_m$(° C.)/$H_f$(J/g) | 90.2/19.6 |
| Tensile Storage Modulus | >1 × $10^5$ dynes/cm$^2$ |

EXAMPLE 3

Preparation of 51% Ethylene, 46.5% Vinyl Acetate, 2.5% Acrylic Acid Polymer Using an Anionic Surfactant Stabilizer System A polymer emulsion containing crystalline ethylene segments was prepared by the following procedure: A one-gallon stainless steel pressure reactor was charged with the following mixture:

| Material | Mass charged, g |
|---|---|
| DI Water | 1100 |
| Aerosol MA80-I | 10 |
| Monomer solution consisting of 95 wt % vinyl acetate and 5 wt % acrylic acid | 120 |

The following delay mixtures were utilized:

| Material | Mass charged, g |
|---|---|
| Aqueous 10.0 wt % ammonium persulfate containing 4.0 wt % sodium bicarbonate | 131 |
| Rhodacal DS-10, diluted to 15% active | 260 |
| Monomer solution consisting of 95 wt % vinyl acetate and 5 wt % acrylic acid | 540 |
| Ethylene | 1400 psig for 5.5 hours |

Rhodacal DS-10 supplied by Rhodia

Agitation at 100 rpm was begun with a nitrogen purge. Agitation was then increased to 900 rpm and the reactor heated to 80° C. After pressurizing the reactor with ethylene to 1400 psig (9754 kPa), 15 g of initiator solution was added at a rate of 5.0 g/minute. When the 15 g of initiator had been added, the initiator delay rate was reduced to 0.30 g/minute. At the 15 minute mark, the monomer delay was begun at 3.0 g/minute and the surfactant delay was begun at 0.72 g/minute. Ethylene pressure of 1400 psig was maintained for 5.5 hours. The vinyl acetate delay was stopped at the 3 hour mark. The ethylene supply was stopped at the 5.5 hour mark. The surfactant delay and the initiator delay were stopped at the 6 hour mark, followed by holding the reaction mixture at temperature for another 30 minutes. The reaction was then cooled to 40° C., transferred to a degasser, and 2 g of Rhodaline 675 defoamer was added. The following properties of the resulting emulsion copolymer were measured:

| Copolymer Composition (by solids calculation) | 51% Ethylene 46.5% Vinyl acetate 2.5% Acrylic acid |
|---|---|
| Tg Onset (° C.) | −29.1 |
| Viscosity (60/12 rpm) (cps) | 400/1260 |
| % solids | 46.5 |
| pH | 4.40 |
| $T_m$(° C.)/$H_f$(J/g) | 86.2/10.3 |
| Tensile Storage Modulus | >1 × $10^5$ dynes/cm$^2$ |

EXAMPLE 4

Preparation of 42% Ethylene, 55.1% Vinyl Acetate, 2.9% Acrylic Acid Polymer Using an Anionic Surfactant Stabilizer System The procedure of Example 3 was followed, except 700 psig (4928 kPa) ethylene pressure was maintained for the first 3 hours of the polymerization followed by 1400 psig (9754 kPa) ethylene pressure for the next 2.5 hours of the polymerization.

The following properties of the resulting emulsion polymer were measured:

| Polymer Composition (by solids calculation) | 42% Ethylene 55.1% Vinyl acetate 2.9% Acrylic acid |
|---|---|
| $T_g$ Onset (° C.) | −6.7 |
| Viscosity (60/12 rpm) (cps) | 1100/2930 |
| % solids | 45.5 |
| pH | 4.53 |
| $T_m$(° C.)/$H_f$(J/g) | 91.3/24.2 |

EXAMPLE 5

Preparation of 43% Ethylene, 52% Vinyl Acetate, 5% N-Methylolacrylamide Polymer Using an Anionic Surfactant Stabilizer System A three-gallon stainless steel pressure reactor was charged with the following mixture:

| Material | Mass charged, g |
|---|---|
| DI Water | 3300 |
| Aerosol MA-80-I | 30 |
| Vinyl Acetate | 360 |

The following delay mixtures were utilized:

| Material | Mass charged, g |
|---|---|
| Aqueous 10.0% ammonium persulfate containing 4.0% sodium bicarbonate | 345 |
| Aqueous 15.0% diluted solution of Rhodacal DS-10 | 795 |
| Vinyl Acetate | 1655 |

-continued

| Material | Mass charged, g |
|---|---|
| N-methylolacrylamide (48%) (NMA) | 419 |
| Ethylene | 1400 psig for 5.5 hours |

Agitation at 100 rpm was begun with a nitrogen purge. Agitation was then increased to 600 rpm and the reactor heated to 80° C. After pressurizing the reactor with ethylene to 1400 psig (9754 kPa), 15 g of initiator solution was added at a rate of 5.0 g/minute. After the 15 g of initiator were in the reactor, the initiator delay rate was reduced to 0.90 g/minute. At initiation, the vinyl acetate delay was begun at 9.0 g/min, the surfactant delay was begun at 2.16 g/min, and the NMA delay was begun at 1.17 g/minute. Ethylene pressure of 1400 psig was maintained for 5.5 hours. The vinyl acetate delay was stopped at the 3 hour mark. The ethylene supply was stopped at the 5.5 hour mark. The surfactant delay, NMA delay, and initiator delay were stopped at the 6 hour mark, followed by holding the reaction mixture at temperature for another 30 minutes. The reaction was then cooled, transferred to a degasser, and 2 g of Rhodaline 675 defoamer was added. The following properties of the resulting emulsion polymer were measured:

| | |
|---|---|
| Polymer Composition (by solids calculation) | 43% Ethylene |
| | 52% Vinyl acetate |
| | 5% NMA |
| $T_g$ Onset (° C.) | −29.6 |
| Viscosity (60/12 rpm) (cps) | 53/55 |
| 100/325 mesh coagulum (ppm) | <35/<236 |
| % solids | 47.2 |
| pH | 5.2 |
| $T_m$(° C.)/$H_f$(J/g) | 79.0/12.2 |
| Tensile Storage Modulus | >1 × $10^5$ dynes/cm$^2$ |

EXAMPLE 6

Preparation of 39% Ethylene, 58% Vinyl Acetate, 3% Acrylic Acid Polymer Using a Hydroxyethyl Cellulose/Surfactant Stabilizer System A polymer emulsion containing crystalline ethylene segments was prepared by first charging a one-gallon stainless steel pressure reactor with the following mixture:

| Material | Mass charged, g |
|---|---|
| DI Water | 700 |
| Rhodacal DS-10 | 9 |
| Natrosol 250GR (2% aqueous solution) | 500 |
| Ferrous ammonium sulfate (2% aqueous solution) | 6 |
| Monomer Solution comprising 94.71 wt % vinyl acetate, 4.71 wt % acrylic acid, and 0.571 wt % dodecylmercaptan | 150 |

The following delay mixtures were utilized:

| Material | Mass charged, g |
|---|---|
| Aqueous 4.0% t-BHP | 118 |
| Aqueous 8% sodium formaldehyde sulfoxylates | 127 |
| Aqueous solution containing 52.5 g Rhodacal DS-10 and 297.5 g water | 253 |
| Monomer Solution comprising 94.71 wt % vinyl acetate, 4.71 wt % acrylic acid, and 0.571 wt % dodecylmercaptan | 540 |
| Ethylene | 700 psig for 3 hours |
| | 1400 psig for 3 hours |

Agitation at 100 rpm was begun with a nitrogen purge. Agitation was then increased to 900 rpm and the reactor heated to 60° C. After pressurizing the reactor with ethylene to 700 psig (4928 kPa), 10 g of 8% aqueous sodium formaldehyde sulfoxylate was added to the reactor. Delay feeds of tert-butylhydrogen peroxide (4%) at 0.3 g/minute and 8% sodium formaldehyde sulfoxylate at 0.3 g/minute were begun. At initiation, the surfactant delay was begun at 0.65 g/minute and the monomer solution delay was begun at 3.0 g/minute. Ethylene pressure of 700 psig was maintained for 3 hours. At the 3 hour mark, the monomer solution delay was turned off and the ethylene pressure was increased to 1400 psig (9754 kPa). At the 6 hour mark, the ethylene makeup valve was closed. The surfactant delay and redox delays were stopped at the 6.5 hour mark. The reaction was then cooled to 40° C., transferred to a degasser to remove unreacted ethylene, and 2 g of Rhodaline 675 defoamer was added. The following properties of the resulting emulsion polymer were measured:

| | |
|---|---|
| Polymer Composition (By solids calculation) | 39% Ethylene |
| | 58% Vinyl acetate |
| | 3% Acrylic Acid |
| $T_g$ Onset (° C.) | −9.7 |
| Viscosity (60/12 rpm) (cps) | 920/2240 |
| % solids | 42.0 |
| pH | 4.27 |
| $T_m$(° C.)/$H_f$(J/g) | 95.7/28.2 |
| Tensile Storage Modulus | >1 × $10^5$ dynes/cm$^2$ |

EXAMPLE 7

Preparation of 55% Ethylene, 42.5% Vinyl Acetate, 2.5% Acrylic Acid Polymer Using an Anionic Surfactant/Colloid Stabilizer System A polymer emulsion containing crystalline ethylene segments was prepared by the following procedure: A one-gallon stainless steel pressure reactor was charged with the following mixture

| Material | Mass charged, g |
|---|---|
| DI Water | 800 |
| Aerosol MA80-I | 10 |
| Natrosol 250GR (2%) | 300 |
| Monomer solution consisting of 95 wt % vinyl acetate and 5 wt % acrylic acid | 120 |

The following delay mixtures were utilized:

| Material | Mass charged, g |
|---|---|
| Aqueous 10.0 wt % ammonium persulfate containing 4.0 wt % sodium bicarbonate | 124 |
| Rhodacal DS-10, diluted to 15% active | 260 |
| Monomer solution consisting of 95 wt % vinyl acetate and 5 wt % acrylic acid | 540 |
| Ethylene | 1400 psig for 5.5 hours |

Agitation at 100 rpm was begun with a nitrogen purge. Agitation was then increased to 900 rpm and the reactor heated to 80° C. After pressurizing the reactor with ethylene to 1400 psig (9754 kPa), 15 g of initiator solution was added at a rate of 1.0 g/minute. When the 15 g of initiator had been added, the initiator delay rate was reduced to 0.30 g/minute. At the 15 minute mark, the monomer delay was begun at 3.0 g/minute and the surfactant delay was begun at 0.72 g/minute. Ethylene pressure of 1400 psig was maintained for 5.5 hours. The vinyl acetate delay was stopped at the 3 hour mark. The ethylene supply was stopped at the 5.5 hour mark. The surfactant delay and the initiator delay were stopped at the 6 hour mark, followed by holding the reaction mixture at temperature for another 30 minutes. The reaction was then cooled to 40° C., transferred to a degasser, and 2 g of Rhodaline 675 defoamer was added. The following properties of the resulting emulsion copolymer were measured:

| Copolymer Composition (by solids calculation) | 55% Ethylene 42.5% Vinyl acetate 2.5% Acrylic acid |
|---|---|
| $T_g$ Onset(° C.) | −32.2 |
| Viscosity (60/12 rpm) (cps) | 1950/4590 |
| % solids | 50.3 |
| pH | 4.25 |
| $T_m$(° C.)/$H_f$(J/g) | 88.2/21.1 |
| Tensile Storage Modulus | >1 × 10$^5$ dynes/cm$^2$ |

EXAMPLE 8

Preparation of 80% Ethylene, 20% Vinyl Acetate Polymer Using an Anionic Surfactant/Colloid Stabilizer System A polymer emulsion containing crystalline ethylene segments was prepared by the following procedure: A one-gallon stainless steel pressure reactor was charged with the following mixture:

| Material | Mass charged, g |
|---|---|
| DI Water | 1000 |
| Rhodapon UB | 60 |
| Natrosol 250GR (2%) | 500 |
| Vinyl Acetate | 100 |

Rhodapon is sodium lauryl sulfate

The following delay mixtures were utilized:

| Material | Mass charged, g |
|---|---|
| Aqueous 10.0 wt % ammonium persulfate containing 3.0 wt % sodium bicarbonate | 98 |
| Rhodapon UB, diluted to 10% active | 360 |
| Vinyl Acetate | 150 |
| Ethylene | 1400 psig for 5 hours |

Agitation at 100 rpm was begun with a nitrogen purge. Agitation was then increased to 900 rpm and the reactor heated to 80° C. After pressurizing the reactor with ethylene to 1400 psig (9754 kPa), 5 g of initiator solution was added at a rate of 5.0 g/minute. When the 5 g of initiator had been added, the initiator delay rate was reduced to 0.30 g/minute. At the 10 minute mark, the vinyl acetate delay was begun at 0.50 g/minute and the surfactant delay was begun at 1.20 g/minute. Ethylene pressure of 1400 psig was maintained for 5 hours. All delay feeds were stopped at the 5 hour mark, followed by holding the reaction mixture at temperature for another 30 minutes. The reaction was then cooled to 40° C., transferred to a degasser, and 2 g of Rhodaline 675 defoamer was added. The following properties of the resulting emulsion copolymer were measured:

| Copolymer Composition (by solids calculation) | 80% Ethylene 20% Vinyl acetate |
|---|---|
| $T_g$ Onset (° C.) | −39.5 |
| Viscosity (60/12 rpm) (cps) | 44/50 |
| % solids | 38.9 |
| pH | 5.46 |
| $T_m$(° C.)/$H_f$(J/g) | 81.6/67.3 |
| Tensile Storage Modulus | >1 × 10$^5$ dynes/cm$^2$ |

EXAMPLE 9

Preparation of 52% Ethylene, 45.6% Vinyl Acetate, 2.4% Acrylic Acid Polymer Using an Anionic Surfactant Stabilizer System The emulsion polymerization procedure of Example 3 was followed, except the ethylene pressure remained at 1400 psig until the 6 hour mark and the vinyl acetate delay was reduced to a rate of 1.0 g/minute at the 1.5 hour mark of the polymerization and remained at this rate until the 6 hour mark where all delay feeds were stopped. The following properties of the resulting emulsion copolymer were measured:

| Copolymer Composition (by solids calculation) | 52% Ethylene 45.6% Vinyl acetate 2.4% Acrylic acid |
|---|---|
| $T_g$ Onset(° C.) | −35.7 |
| Viscosity (60/12 rpm) (cps) | 795/2100 |
| % solids | 49.7 |
| pH | 4.64 |
| $T_m$(° C.)/$H_f$(J/g) | 61.8/21.4 |

EXAMPLE 10

Preparation of 38% Ethylene, 59.9% Vinyl Acetate, 2.1% Acrylic Acid Polymer Using an Anionic and Nonionic Surfactant Stabilizer System A polymer emulsion containing crystalline ethylene segments was prepared by the following procedure: A one-gallon stainless steel pressure reactor was charged with the following mixture:

| Material | Mass charged, g |
|---|---|
| DI Water | 800 |
| Aerosol MA80-I | 8 |
| Sodium citrate | 1 |
| Vinyl Acetate | 130 |

The following delay mixtures were utilized:

| Material | Mass charged, g |
|---|---|
| Aqueous 10.0 wt % ammonium persulfate containing 4.0 wt % sodium bicarbonate | 119 |
| Surfactant delay consisting of: 14.8 wt % Igepal CO-887 (70%), 4.2 wt % Igepal CO-630 (100%), 4.9 wt % Lubrizol 2403 (50%), and 76.1 wt % water | 360 |
| Monomer solution consisting of 95.1 wt % vinyl acetate, 4.3 wt % acrylic acid, and 0.6 wt % dodecylmercaptan | 540 |
| Ethylene | 700 psig for 3 hours |
|  | 1400 psig for 2.5 hours |

Igepal CO 887 is ethoxylated phenol having 30 moles ethylene oxide and an HLB or 17.4
Igepal CO 630 is ethoxylated phenol having an HLB of 13
Lubrizol 2403 is a 50% solution of 1-Propanesulfonic acid, 2-methyl-2-((1-oxo-2-propenyl)amino)-, monosodium salt The initial reactor charge (minus vinyl acetate) was adjusted to pH=4.0 with citric acid. Agitation at 100 rpm was begun with a nitrogen purge and the initial vinyl acetate was added to the reactor. Agitation was then increased to 600 rpm and the reactor heated to 80° C. After pressurizing the reactor with ethylene to 700 psig, 10 g of initiator solution was added at a rate of 1.0 g/minute. When the 10 g of initiator had been added, the initiator delay rate was reduced to 0.30 g/minute. At initiation, the monomer delay was begun at 3.0 g/minute and the surfactant delay was begun at 1.0 g/minute. At the 1 hour mark, the agitation rate was increased to 1000 rpm. Ethylene pressure of 700 psig (4928 kPa) was maintained until the 3 hour mark. At the 3 hour mark, the vinyl acetate delay was stopped and the ethylene pressure increased to 1400 psig (9754 kPa) as fast as possible. The ethylene supply was then stopped at the 5.5 hour mark. The surfactant delay and the initiator delay were stopped at the 6 hour mark, followed by holding the reaction mixture at temperature for another 30 minutes. The reaction was then cooled to 40° C., transferred to a degasser, and 2 g of Rhodaline 675 defoamer was added. The following properties of the resulting emulsion copolymer were measured:

| Copolymer Composition (by solids calculation) | 38% Ethylene 59.9% Vinyl acetate 2.1% Acrylic acid |
|---|---|
| $T_g$ Onset (° C.) | −8.5 |
| Viscosity (60/12 rpm) (cps) | 23/23 |
| % solids | 48.9 |
| pH | 4.74 |
| $T_m$(° C.)/$H_f$(J/g) | 86.4/21.6 |

EXAMPLE 11

Preparation of 56% Ethylene, 43% Vinyl Acetate, 1% Acrylic Acid Polymer Using an Anionic Surfactant Stabilizer System A polymer emulsion containing crystalline ethylene segments was prepared by the following procedure: A one-gallon stainless steel pressure reactor was charged with the following mixture:

| Material | Mass charged, g |
|---|---|
| DI Water | 1100 |
| Aerosol MA80I | 10 |
| Vinyl Acetate | 100 |

The following delay mixtures were utilized:

| Material | Mass charged, g |
|---|---|
| Aqueous 10.0 wt % ammonium persulfate containing 4.0 wt % sodium bicarbonate | 124 |
| Rhodacal DS-10, diluted to 15% active | 324 |
| Monomer solution consisting of 97 wt % vinyl acetate and 3 wt % acrylic acid | 540 |
| Ethylene | 1500 psig for 5.5 hours |

Agitation at 100 rpm was begun with a nitrogen purge. Agitation was then increased to 1000 rpm and the reactor heated to 80° C. After pressurizing the reactor with ethylene to 1500 psig (10,444 kPa), 15 g of initiator solution was added at a rate of 1.0 g/minute. When the 15 g of initiator had been added, the initiator delay rate was reduced to 0.30 g/minute. At the 15 minute mark, the vinyl acetate delay was begun at 3.0 g/minute and the surfactant delay was begun at 0.90 g/minute. Ethylene pressure of 1500 psig was maintained for 5.5 hours. The monomer delay was stopped at the 3 hour mark. The ethylene valve was closed at the 5.5 hour mark. All other delay feeds were stopped at the 6 hour mark, followed by holding the reaction mixture at temperature for another 30 minutes. The reaction was then cooled to 40° C., transferred to a degasser, and 2 g of Rhodaline 675 defoamer was added. The following properties of the resulting emulsion copolymer were measured:

| Copolymer Composition (by solids calculation) | 56% Ethylene 43% Vinyl acetate 1% Acrylic acid |
|---|---|
| $T_g$ Onset (° C.) | −30.8 |
| Viscosity (60/12 rpm) (cps) | 150/250 |
| % solids | 50.4 |
| pH | 5.41 |
| $T_m$(° C.)/$H_f$(J/g) | 91.3/35.8 |

COMPARATIVE EXAMPLE 12

Comparison of U.S. Pat. No. 6,319,978 Polymer Emulsion Polymerized EVA Having No Ethylene Crystallinity at Temperatures Above Room Temperature The comparative emulsion polymer was prepared by a method similar to the method disclosed in U.S. Pat. No. 6,319,978, Example 2. The polymerization pressure was 1400 psig and the polymerization was effected at 80° C. The resulting polymer is characterized as a pressure sensitive adhesive, and is essentially liquid at temperatures in excess of 115° C., thereby the tensile storage modulus is substantially below $1 \times 10^5$ dynes/cm$^2$ at this temperature. DSC analysis shows that a VAE emulsion polymer prepared by this method exhibits a very low $T_m$ (−2.5° C.) and low $H_f$ (11.5 J/g). Obviously, a coatings formulated with this polymer that is extremely tacky at room temperature condition is not suitable as a water repellant coating for porous substrate.

EXAMPLE 13

Water Repellent Testing of Coated Wood Products

The emulsions described in Examples 2, 3, 4, and 6 were formulated as follows respectively:

| | |
|---|---|
| Emulsion | 40.0 parts by weight |
| Texanol (Eastman Chemical) | 2.0 |
| Surfynol TG (Air Products) | 1.0 |
| Water | 50.0 |

Ingredients were added slowly while under agitation. Mixtures were allowed to sit for a minimum of 16 hours prior to application and testing. These emulsions, along with 5 commercially available water repellents were applied and tested as described above. The results are shown in Table 1.

EXAMPLE 13

Comparison Test Against Commercial VAE Sealants

The following example was carried out in accordance with the general procedures of using the Emulsions of Examples 1–7 versus AIRFLEX® EF811 VAE polymer emulsion and AIRFLEX 500 VAE polymer emulsion, two commercial batch polymerized VAE's having no ethylene crystallinity. The results are shown in Table 2.

The data in Table 2 show that semi-crystalline VAE copolymers perform well and provide advantages in water repellent coatings over traditional emulsions (e.g., amorphous VAE). On the other hand, the VAE polymers having essentially no ethylene crystallinity, i.e., Airflex EF 811 and Airflex 500 emulsion polymers, report the lowest WRE ratings. TPE values were very low for the Examples 2–7 polymer emulsions, indicating very good performance.

It is suggested that the reason for improved repellency associated with VAE polymers is that polyethylene is generally hydrophobic. When ethylene is incorporated into traditional VAEs, its morphology is amorphous, which provides limited hydrophobicity. When a portion of the ethylene is incorporated into the polymer providing a crystalline or semi-crystalline morphology, as described in the specification, the hydrophobicity and water repellency improves due to the tighter and more efficient packing of the crystalline polyethylene polymer chains. In addition, the tighter packing causes a lower surface energy surface and a better barrier.

Crystallinity is observed by the melting temperature ($T_m$) and a heat of fusion ($H_f$) of the polymer. However, with increasing levels of crystallinity within the VAE polymer that can lead to poorer film formation and poorer coalescence, causing a discontinuous film that can allow water to reach the substrate. Poor film formation and coalescence can be improved with addition of coalescing solvents and/or surfactants in the wet coating and/or application of heat during drying of the applied coating.

TABLE 1

| Material | WRE (%) | $T_m$/Hf | QUV-A 500 hours; Color change, 0 (none) to 5(extreme) | QUV-A 500 hours; Tack, 0 (none) to 3 (tacky) | QUV-A 500 hours; Water beading, 0 (none) to 5 (good) | QUV-A 500 hours; Wood condition |
|---|---|---|---|---|---|---|
| Ex. 2 | 62 | 90.2/19.6 | 2 | 1 | 4 | Good |
| Ex. 3 | 55 | 86.8/23.6 | 1 | 2 | 4 | Good |
| Ex. 4 | 58 | 91.3/24.2 | 1 | 1 | 3 | Good |
| Ex. 6 | 53 | 95.7/28.2 | 1 | 1 | 4 | Warped |
| Cuprinol clear deck seal (Sherwin Williams) | 52 | | 3 | 0 | 5 | Good |
| Olympic Maximum (PPG) | 88 | | 2 | 0 | 5 | Good |
| Olympic WaterGuard (PPG) | 87 | | 1 | 0 | 5 | Good |
| Thompson's WaterSeal | 85 | | 4 | 0 | 2 | Warped |

The test results show that the vinyl acetate-ethylene polymeric emulsions were effective in coating the porous wood substrate and resulted in barrier effectiveness equal to or better than many of the commercial grade wood sealant compositions. Example 6 appeared to perform the poorest of the emulsion polymers, in terms of board warp. On inspection, the coating appeared intact and thus, it was believed the board may have been warped.

In addition to the semi-crystalline nature, another factor that may affect their performance is the latex particle size. Coatings applied to porous substrates can either penetrate into the substrate, film form on the substrate, or experience a combination of the two. For many water repellent applications, penetration into the substrate is preferred for several reasons. First, the polymer has very intimate contact with the substrate. Second, it allows for "filling" of the pores. Third, the coating has less tendency to fail by abrasion, cracking, and/or peeling.

The latexes described herein have a large fraction of particles which can penetrate into the surface, i.e., there is a large fraction of the latex particle distribution that has a particle size less than or equal to the pore size of the porous substrate. For many wood surfaces, this pore size is in the 1–2 micron range. Therefore, the described latex systems having a particle size (or a fraction of their particle size distribution) less than this pore diameter range have an ability to penetrate into the substrate. In addition, the described latex systems with smaller particle sizes are more likely to diffuse into these pores to minimize surface energy effects, which is a thermodynamic driving force.

Nonetheless, systems with larger average particle size distributions still may perform well. Firstly, although they have larger average particle size distributions in general, there still is a considerable fraction of particles that are small enough to penetrate into the surface. Secondly, film forming systems, when property film formed to a consistent, coherent and adhesive film on the surface, can still provide water repellency and a barrier to water penetration. In this scenario, larger particle size systems can lead to good film formation, barrier properties and water repellency.

TABLE 2

| SAMPLE | Ethylene (wt %) | VAM (wt %) | AA (wt %) | $T_g$(° C.) | $T_m$(° C.) | $H_f$(J/g) | Particle Size (μm) | WRE | TPE |
|---|---|---|---|---|---|---|---|---|---|
| Ex 1 | 42.5 | 55.0 | 2.5 | −27.9 | 90.8 | 13.9 | 1.121 | 61.32 | 41 |
| Ex 2 | 49.0 | 48.6 | 2.4 | −27.3 | 90.2 | 19.6 | 0.162 | 62.15 | 24 |
| Ex 3 | 51.0 | 46.5 | 2.5 | −29.1 | 86.2 | 10.3 | 0.195 | 54.83 | 25 |
| Ex 4 | 42.0 | 55.1 | 2.9 | −6.7 | 91.3 | 24.2 | 0.259 | 58.10 | 28 |
| Ex 5 | 43.0 | 52.0 | 0 | −30.2 | 76.4 | 15.5 | 0.187 | 51.56 | 36 |
| Ex 6 | 39.0 | 58.0 | 3.0 | −9.7 | 95.7 | 28.2 | 0.461 | 53.43 | 25 |
| Ex 7 | 55.0 | 42.5 | 2.5 | −32.2 | 88.2 | 21.1 | 1.644 | 60.46 | ND |
| Ex 8 | 80.0 | 20.0 | 0 | −39.5 | 81.6 | 67.3 | 1.620 | | 53 |
| Ex 9 | 52.0 | 45.6 | 2.4 | −35.7 | 61.8 | 21.4 | 0.182 | | 38 |
| Ex 10 | 38.0 | 59.9 | 2.1 | −8.5 | 86.4 | 21.6 | | | ND |
| Ex 11 | 56.0 | 43.0 | 1.0 | −30.8 | 91.3 | 35.8 | 0.198 | 54.4 | 37 |
| AIRFLEX EF811 VAE | 12 | 88 | 0 | +11 | None | 0 | | 44.98 | ND |
| AIRFLEX 500 VAE | 15 | 85 | 0 | +5 | None | 0 | | 45.14 | ND |

VAM = vinyl acetate monomer;
AA = acrylic acid
AIRFLEX EF811 VAE polymer emulsion; sold for use in paint formulations.
AIRFLEX 500 VAE polymer emulsion prepared with a stabilizing system of HEC/anionic surfactant, sold for use in paint formulations

The invention claimed is:

1. In a process for imparting barrier properties to porous substrates selected from the group consisting of concrete, masonry products and wood which comprises the steps: applying an aqueous based sealing composition comprising a polymeric resin to said porous substrate, evaporating the water and forming a water repellent coating of said polymeric resin on said porous substrate, the improvement which comprises:

using a polymeric resin comprised of a polymer formed by emulsion polymerization in the presence of a stabilizing system and comprising emulsion polymerized units of ethylene and vinyl acetate and having:
(a) a crystalline melting point ranging from 35 to 110° C. measured at a heat rate of 20° C. per minute;
(b) a tensile storage modulus of at least $1 \times 10^5$ dynes/cm² at a temperature of 115° C. and measured at 6.28 rad/sec;
(c) a crystalline heat of fusion of from about 5 to 100 joules per gram as measured at a heat rate of 20° C. per minute; and,
(d) a glass transition temperature from +25° C. to about −35° C. as measured at a heat rate of 20° C. per minute.

2. The process of claim 1 wherein the polymer is comprised of emulsion polymerized units of from 15 to 80 wt % vinyl acetate, 20 to 85 wt % ethylene, and 0 to 5 wt % of a carboxylic acid, based on the total weight of the polymer.

3. The process of claim 1 wherein the polymer is comprised of emulsion polymerized units of from 40 to 70 wt % of vinyl acetate and from about 30 to 60 wt % of ethylene, based upon the total weight of the polymer.

4. The process of claim 3 wherein the polymer is also comprised of about 0.1 to about 10 wt % of polymerized units of a monomer selected from the group consisting of a carboxylic acid and N-methylolacrylamide.

5. The process of claim 3 wherein the polymer has a tensile storage modulus of at least $2 \times 10^5$ dynes/cm² at 115° C. and measured at 6.28 rad/sec.

6. The process of claim 2 wherein the polymer is comprised of polymerized units of ethylene, vinyl acetate, and acrylic acid.

7. The process of claim 6 wherein the crystalline heat of fusion ranges from 10 to 50 joules per gram as measured at a heat rate of 20° C. per minute.

8. The process of claim 6 wherein the crystalline melting point ranges from 50 to 100° C. as measured at a heat rate of 20° C. per minute.

9. The process of claim 7 wherein a portion of the emulsion polymerization is carried out at a pressure of from 1000 to 2000 psig (6,996 to 13,891 kPa).

10. The process of claim 7 wherein the stabilizing system comprises hydroxyethyl cellulose in combination with a surfactant.

11. The process of claim 7 wherein the stabilizing system includes a surfactant selected from the group consisting of an anionic surfactant and a nonionic surfactant.

12. The process of claim 4 wherein the polymer comprises polymerized units of vinyl acetate, ethylene, and N-methylolacrylamide.

13. The process of claim 12 wherein the crystalline melting point ranges from 50 to 100° C. as measured at a heat rate of 20° C. per minute.

* * * * *